United States Patent Office 2,742,484
Patented Apr. 17, 1956

2,742,484

β-SULFONATION OF ANTHRAQUINONE CONTAINING MERCURY

Albert Bloom, Summit, N. J., assignor to General Aniline & Film Corporation, New York, N. Y., a corporation of Delaware No Drawing. Application November 5, 1954, Serial No. 467,231

11 Claims. (Cl. 260—370)

This invention relates to the sulfonation of anthraquinone to produce beta-substituted anthraquinone sulfonic acids which are valuable dyestuff intermediates. More specifically, it is concerned with an improved process which permits the use of anthraquinone containing mercury in the manufacture of the above-mentioned anthraquinone sulfonic acids. Still more specifically, it is directed to a method involving the use of anthraquinone or benzoyl-2-benzoic acid containing mercury in the production of anthraquinone-2-sulfonic acid and anthraquinone 2,6- and 2,7-disulfonic acids, and for using anthraquinone-1-sulfonic acid containing mercury for the production of anthraquinone-1,6- and 1,7-disulfonic acid.

The sulfonation of anthraquinone, as such or formed in situ by the cyclization of benzoyl-2-benzoic acid, for the production of anthraquinone-1-sulfonic acid by established procedures using mercury as a catalyst, gives a considerable amount, usually above 30% of theory, of recovered anthraquinone as a by-product. This recovered anthraquinone, containing a large part of the mercury added to catalyze the alpha sulfonation of the anthraquinone, may readily be consumed only in further manufacture of anthraquinone-1-sulfonic acid or anthraquinone-1,5- or 1-8-disulfonic acid where the presence of mercury catalyzes the alpha sulfonation. When such anthraquinone, containing mercury, is used in the beta sulfonation of anthraquinone, the mercury present causes the formation of a considerable amount of anthraquinone-1-sulfonic acid or 1-5- and 1-8-disulfonic acid. These facts limit the use of anthraquinone containing mercury, to those sulfonations of anthraquinone where it is desired that the sulfonic acid group enter in one or more alpha positions.

The sulfonation of anthraquinone in the presence or absence of catalysts has been thoroughly investigated and reported by K. Lauer, Prakt. Chemie, 130, 231 (1931), Ibid., 216. In these publications it is shown that sulfonation of anthraquinone in the absence of catalysts gives almost exclusively beta compounds, whereas, in the presence of mercury, or its salts, alpha derivatives are formed almost exclusively. The mechanism of this catalytic effect of mercury and its salts is presumed to be due to the formation of a mercury compound of anthraquinone containing the mercury in the alpha position which, on further reaction with sulfuric acid, gives the alpha sulfonic acid. As evidence that mercury and its salts form compounds with anthraquinone, it is shown that anthraquinone recovered from a mercury catalyzed sulfonation contains organically bound mercury and that this material when further sulfonated gives anthraquinone alpha sulfonic acids. The marked catalytic effect of mercury and its salts in the sulfonation of anthraquinone is further demonstrated by the fact that when anthraquinone-alpha-sulfonic acid is further sulfonated in the presence of mercury, there is formed the alpha-alpha-disulfonic acid, whereas, sulfonation of anthraquinone-alpha-sulfonic acids in the absence of mercury gives rise to alpha, beta-anthraquinone disulfonic acids. Likewise, anthraquinone-beta-sulfonic acid, when further sulfonated in the absence of mercury or its salts, gives rise to beta, beta-anthraquinone disulfonic acids. This is illustrated in the following equations:

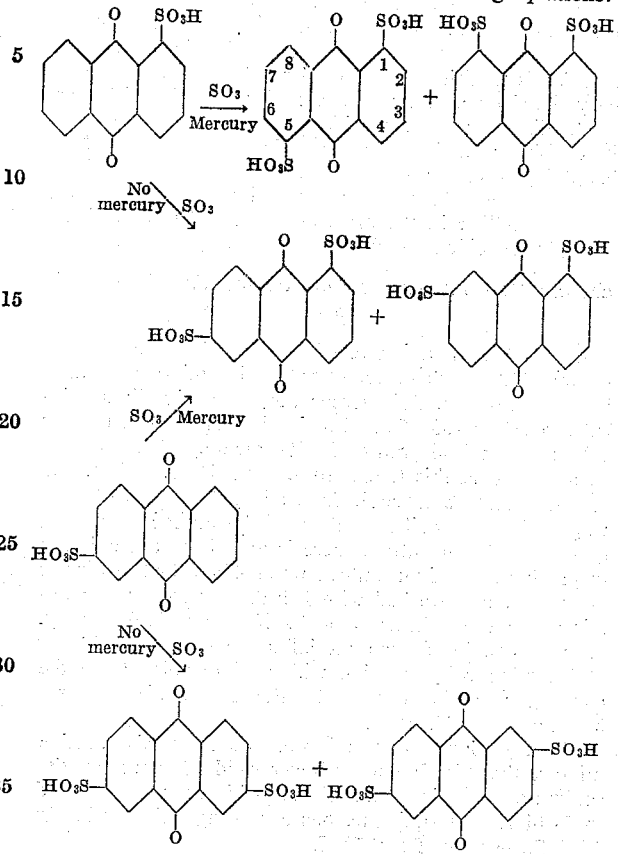

It is, therefore, readily seen that when anthraquinone is sulfonated in the presence of mercury to give the commercially valuable anthraquinone alpha-sulfonic acid, there is obtained as the by-product unreacted anthraquinone containing bound mercury, thereby limiting the usefulness of this recovered anthraquinone to further alpha-sulfonations. It will also be apparent that if it was desired to produce anthraquinone 1-6- or 1-7-disulfonic acid from anthraquinone-1-sulfonic acid obtained by established procedures using mercury as a catalyst, it has heretofore been necessary to free the anthraquinone-1-sulfonic acid of mercury in order to obtain the 1-6- or 1-7-disulfonic acid in good yield and purity.

I have found that anthraquinone containing mercury can be used for the manufacture of beta-substituted anthraquinone sulfonic acids in an inexpensive, commercially practical process by carrying out the sulfonation in the presence of a small amount of a hydrogen halide. This is accomplished by adding to the sulfonation reaction mixture a small amount of HCl gas or, more preferably, adding thereto an inorganic chloride (preferably sodium or potassium chloride) or an agent capable of giving rise to HCl in sulfuric acid. By carrying out the sulfonation reaction in the presence of a small amount of HCl, the mercury present no longer exerts its catalytic influence and smooth beta-sulfonations occur. Such beta-sulfonation has been obtained, when operating in accordance with the present invention, using recovered anthraquinone containing up to 0.5% mercury as an impurity. Possibly somewhat greater amounts of mercury can be tolerated in the anthraquinone employed in the present process, however, in the interest of good yield and purity of desired product, the anthraquinone used in practicing my invention should, from a practical standpoint, contain less than 0.5% mercury.

My findings were quite unexpected in view of prior teaching that mercury chlorides are equivalent to mercury sulfate in the alpha-sulfonation of anthraquinone. (See Groggins "Unit Processes in Organic Synthesis," third ed., p. 306, McGraw-Hill Book Co., Inc.)

It is believed that the mercury present combines with the halogen to form a compound which does not influence the alpha-sulfonation of anthraquinone. When sodium chloride is used in the proposed process, crystals of mercury chloride collect on the cover of the reaction chamber.

My discovery is of considerable economic value since it furnishes a method for consuming a by-product which heretofore has had restricted use.

The details of the present invention will be apparent to those skilled in the art from a consideration of the following specific example:

*Example I.—Preparation of anthraquinone-2-sulfonic acid*

Into suitable reaction vessel charge 300 grams of 20% oleum, 240 grams of recovered anthraquinone containing more than 0.005% mercury, 3 grams of sodium chloride. Heat to 135° C. and maintain this temperature for 2 hours. Add 66 grams of 60% oleum. Heat to 150° C. and hold at this temperature for 1 hour. Allow the reaction mixture to cool, drown into 1½ liters of cold water. Heat to boil and filter off the unreacted anthraquinone. To the filtrate there is added sodium chloride to precipitate sodium anthraquinone-2-sulfonate which is filtered off and washed with a little salt solution to obtain a sodium anthraquinone-2-sulfonate in 75% theory. When a sample of this material is converted to 2-chloroanthraquinone by reaction with sodium chlorate in the usual manner, the resultant 2-chloroanthraquinone has a melting point of 207° C.

If the sodium chloride is not added to this reaction mixture there is obtained a lower yield of poorer quality sodium anthraquinone-2-sulfonate which, when converted to 2-chloroanthraquinone, has a melting point of below 200° C., usually 192–197° C.

It will be understood that the foregoing example is illustrative only of the invention, and that the various modifications therein will suggest themselves to those skilled in the art.

For example, it is to be understood that, while sodium chloride is preferred as a source of HCl in the sulfonation mixture, other alkali halides may be used in place thereof. Thus, potassium or calcium chlorides or bromides can be employed. It will also be apparent that, if desired, HCl per se may be added in place of adding an alkali halide, which liberates hydrogen halide in the presence of sulfuric acid. Other materials, which can be added (in place of sodium chloride used in the foregoing example) to furnish a source of HCl in sulfuric acid, may be chlorosulfonic acid, phosphorus chlorides, benzotrichloride, and the like. As indicated by the above example, the amount of hydrogen halide present during the sulfonation need not be great, so long as the amount present is in excess of that required to combine with the mercury present as an impurity in the anthraquinone compound being sulfonated. Thus, as shown in the foregoing example, the amount of sodium chloride added was such that the mercury content of the anthraquinone was reduced below 0.005%, assuming the reaction to be

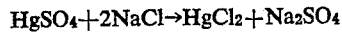

Somewhat larger amounts of HCl may be present, but very large excesses of HCl are, of course, preferably avoided.

It will be understood that the other conditions of sulfonation; e. g., relative amounts of and the strength of sulfuric acid, temperature of sulfonation, time of sulfonation, etc., may be those heretofore employed in the art in the production of anthraquinone sulfonic acids. Preferred conditions for the production of anthraquinone-2-sulfonic acid have been illustrated in the foregoing example.

As previously indicated, the process of the present invention is applicable, not only to the production of anthraquinone-mono-$\beta$-sulfonic acid from anthraquinone contaminated with mercury, but is also applicable to the production from such mercury-contaminated anthraquinone of the di-$\beta$-sulfonic acids. If the anthraquinone-2,6- and 2,7-disulfonic acids are desired, the anthraquinone-2-sulfonic acid obtained, as described in the foregoing example, may be further sulfonated in the manner known in the art to produce anthraquinone-2,6- and 2,7-disulfonic acid; the conditions of sulfonation being those heretofore known in the art, and relatively low temperatures and short reaction times favoring the production of the 2,7-disulfonic acid, while higher temperatures and longer reaction times favor the production of the 2,6-disulfonic acid.

The following example illustrates the production of anthraquinone-2,6- and 2,7-disulfonic acid by the process of the present invention:

*Example II*

Into a suitable reaction vessel charge 4 g. sodium chloride, 380 g. 50% oleum. Add alternately at 60–90° C., 162 g. anthraquinone containing more than 0.005% mercury and 40 g. sodium sulfate anhydrous. Heat to 150° C. and hold at this temperature for 5 hours. Dilute with water to 30° Baumé, add 200 cc. of a saturated aqueous solution of sodium chloride. Cool the reaction mixture and filter. Save the filtrate for isolation of anthraquinone 2,7-disulfonic acid. Slurry the cake in 800 cc. of 6° Baumé sodium chloride solution. Filter and collect the precipitated sodium anthraquinone 2-6-disulfonate. The yield is 43% of theory. Anthraquinone 2-7-disulfonic acid salts may be isolated from the above indicated filtrate in the usual manner.

As previously stated, the process of the present invention is also applicable for the $\beta$-sulfonation of anthraquinone-1-sulfonic acid obtained by sulfonation of anthraquinone in the presence of mercury compounds. The thus obtained anthraquinone-1-sulfonic acid may still contain traces of mercury and further sulfonation thereof, as is well known in the art, results in the production of substantial amounts of $\alpha$-$\alpha'$-disulfonic acids; i. e., anthraquinone-1,5- and 1,8-disulfonic acid. By carrying out the sulfonation of anthraquinone-1-sulfonic acid, contaminated with mercury in the presence of a hydrogen halide, in accordance with the present invention, the further sulfonation is a $\beta$-sulfonation, and anthraquinone-1,6- and 1,7-disulfonic acids are obtained. The following example illustrates specific conditions which may be used for such sulfonation:

*Example III*

Into a suitable reactor charge 300 g. 40% oleum and 3 g. sodium chloride. Add 200 g. potassium anthraquinone-1-sulfonate containing more than 0.005% mercury. Heat to 100° C. On completion of the sulfonation reaction the mass may be neutralized with calcium carbonate and, after removal of calcium sulfate, the anthraquinone, 1,7-disulfonic acid may be recovered by methods known in the art, e. g., as described by Iljinski, Ber. 36, 4198 (1903).

I claim:

1. In the sulfonation with fuming sulfuric acid of anthraquinone compounds containing a small amount of mercury in the range of 0.005 to 0.5% and selected from the group consisting of unsulfonated anthraquinone recovered from the $\alpha$-sulfonation of anthraquinone in the presence of mercury and $\alpha$-monosulfonated anthraquinone prepared by sulfonation of anthraquinone in the presence of mercury; the improvement for effecting $\beta$-sulfonation of said anthraquinone compound which comprises carrying out such sulfonation in the presence of an amount of a hydrogen halide selected from the group consisting of hydrogen chloride and hydrogen bromide in excess of the stoichiometric amount based on the amount of mercury present.

2. A process as defined in claim 1 wherein the hydrogen halide specified is HCl.

3. A process as defined in claim 2 wherein the HCl specified is found formed in the sulfonation mass by introducing a small amount of NaCl thereinto.

4. In the sulfonation with fuming sulfuric acid of anthraquinone containing a small amount of mercury in the range of 0.005 to 0.5% and which has been recovered from the α-sulfonation of anthraquinone in the presence of a small amount of mercury; the improvement for effecting β-sulfonation of said anthraquinone which comprises carrying out such sulfonation in the presence of an amount of a hydrogen halide selected from the group consisting of hydrogen chloride and hydrogen bromide in excess of the stoichiometric amount based on the amount of mercury present.

5. A process as defined in claim 4 wherein the hydrogen halide specified is HCl.

6. A process as defined in claim 5 wherein the HCl specified is formed in the sulfonation mass by introducing a small amount of NaCl thereinto.

7. In the sulfonation with fuming sulfuric acid of anthraquinone 1-sulfonic acid containing a small amount of mercury in the range of 0.005 to 0.5% and produced by the α-sulfonation of anthraquinone in the presence of a small amount of mercury, the improvement for effecting β-sulfonation of said anthraquinone 1-sulfonic acid to produce anthraquinone 1,6- and 1,7-disulfonic acids which comprises carrying out such sulfonation in the presence of an amount of a hydrogen halide selected from the group consisting of hydrogen chloride and hydrogen bromide in excess of the stoichiometric amount based on the amount of mercury present.

8. A process as defined in claim 7 wherein the hydrogen halide specified is HCl.

9. A process as defined in claim 8 wherein the HCl specified is formed in the sulfonation mass by introducing a small amount of NaCl thereinto.

10. The method of effecting β-sulfonation of anthraquinone compounds, containing a small amount of mercury in the range of 0.005 to 0.5% and selected from the group consisting of unsulfonated anthraquinone recovered from the α-sulfonation of anthraquinone and α-monosulfonated anthraquinone prepared by sulfonation of anthraquinone in the presence of mercury, which comprises treating such anthraquinone compound with a hydrogen halide selected from the group consisting of hydrogen chloride and hydrogen bromide in an amount sufficient to react with the mercury present therein to form mercuric halide and sulfonating said anthraquinone compound with fuming sulfuric acid.

11. The method as defined in claim 10 wherein the hydrogen halide specified is HCl.

References Cited in the file of this patent

Groggins: Unit Processes in Organic Synthesis (4th ed.), p. 308 (1952).